US012654548B2

(12) United States Patent (10) Patent No.: US 12,654,548 B2
Gudapati (45) Date of Patent: Jun. 16, 2026

(54) ENHANCED VEHICLE SECUREMENT SYSTEM

(71) Applicant: FCA US LLC, Auburn Hills, MI (US)

(72) Inventor: Abhilash Gudapati, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/913,361

(22) Filed: Oct. 11, 2024

(65) Prior Publication Data

US 2026/0103075 A1 Apr. 16, 2026

(51) Int. Cl.
*B60K 28/04* (2006.01)
*B60K 28/12* (2006.01)
(52) U.S. Cl.
CPC .............. *B60K 28/04* (2013.01); *B60K 28/12* (2013.01)
(58) Field of Classification Search
CPC ................................ B60K 28/04; B60K 28/12
USPC .................................... 701/36, 45, 48, 49, 70
See application file for complete search history.

(56) References Cited

U.S. PATENT DOCUMENTS

2018/0354363 A1* 12/2018 Rolfes .................... B60K 28/04
2019/0210459 A1* 7/2019 Kojima .................. B60K 28/12
2023/0235819 A1 7/2023 Yurina et al.

FOREIGN PATENT DOCUMENTS

CN 119037132 B * 10/2025 ............. B60K 28/04
DE 102017128035 A1 5/2018
EP 1063453 A1 12/2000
GB 2523198 A * 8/2015 ............. B60K 28/12

OTHER PUBLICATIONS

International Search Report and Written Opinion dated Mar. 11, 2026 for International Application No. PCT/US2025/050229, International Filing Date Oct. 9, 2025.

* cited by examiner

*Primary Examiner* — Hai H Huynh
(74) *Attorney, Agent, or Firm* — Jeremy J. Klobucar

(57) ABSTRACT

A vehicle system having an automatic vehicle securement feature to prevent an unoccupied vehicle from driving away includes a controller programmed to initiate the automatic vehicle securement feature, if a first set of conditions is satisfied, by engaging the parking brake and/or parking pawl to thereby prevent the vehicle from driving away. The controller determines if there is a fault of the first set of conditions, if the first set of conditions is not satisfied, and then determines, by the camera-based monitoring system, if a driver is present within the vehicle, if there is a fault of the first set of conditions. The controller initiates the automatic vehicle securement feature if the driver is determined not present within the vehicle, even though the first set of conditions is not satisfied.

18 Claims, 5 Drawing Sheets

| S no. | Driver Presence sensor status (Camera) | Driver Presence sensor status (On seat) | | Driver Door Ajar Status | Driver Seat Belt Status | DAI Feature | Conditions |
|---|---|---|---|---|---|---|---|
| 1 | Not considered for DAI | Not Faulted | | Not Faulted | Not Faulted | Enabled | Normal condition |
| 2 | Not considered for DAI | Not Faulted | | Not Faulted | Faulted | Enabled | Door Ajar is considered as the last trigger; can detect that the seat belt is faulted due to the seat belt HMI. If the vehicle has driver door connected/ON, the driver presence sensor will be utilized for detection |
| 3 | Considered for DAI | Faulted | OR | Faulted | Not Faulted | Enabled | When Driver presence sensor from seat is faulted or door ajar is faulted, driver presence camera-based sensor will be used for DAI enablement. The supervisory controller also provides a request to Brake system (to engage park brake, if available) |
| 4 | Considered for DAI | Faulted | | Faulted | Faulted | Enabled | When any of the other critical conditions are faulted, driver presence camera-based sensor will be used for securement. The supervisory controller also provides a request to Brake System (to engage park brake, if available) |

| S no. | Driver Presence sensor status (Camera) | Driver Presence sensor status (On seat) | Driver Door Ajar Status | Driver Seat Belt Status | DAI Feature | Conditions |
|---|---|---|---|---|---|---|
| 1 | Not considered for DAI | Not Faulted | Not Faulted | Not Faulted | Enabled | Normal condition |
| 2 | Not considered for DAI | Not Faulted | Not Faulted | Faulted | Enabled | Door Ajar is considered as the last trigger, can detect that the seat belt is faulted due to the seat belt HMI. If the vehicle has driver door connected/ON, the driver presence sensor will be utilized for detection |
| 3 | Considered for DAI | Faulted | Faulted | Not Faulted | Enabled | When Driver presence sensor from seat is faulted or door ajar is faulted, driver presence camera-based sensor will be used for DAI enablement. The supervisory controller also provides a request to Brake system (to engage park brake, if available) |
| | | *OR* | | | | |
| 4 | Considered for DAI | Faulted | Faulted | Faulted | Enabled | When any of the other critical conditions are faulted, driver presence camera-based sensor will be used for securement. The supervisory controller also provides a request to Brake System (to engage park brake, if available) |

FIG. 2

ENHANCED VEHICLE SECUREMENT SYSTEM

FIELD

The present application relates generally to vehicle control systems and, more particularly, to vehicle control systems to provide vehicle securement.

BACKGROUND

Some vehicles are equipped with a drive away inhibition (DAI) or a vehicle securement function configured to prevent a vehicle from unintentionally driving away. This may occur when the driver exits the vehicle and Reverse, Neutral, Drive, or any other non-park PRND state is selected, while the brake pedal is not pressed, the seat belt is unbuckled, and/or when the driver door is ajar. If such conditions are detected, and all enable criteria are met, the vehicle will activate the DAI strategy to secure the vehicle, for example, by automatically engaging a vehicle park pawl or electronic park brake. However, unforeseen system faults may cause the conditions to go undetected and prevent activation of the DAI strategy. Thus, while such systems work well for their intended purpose, it is desirable to provide continuous improvement in the relevant art to provide greater utility.

SUMMARY

In accordance with one example aspect of the invention, a vehicle system having an automatic vehicle securement feature to prevent an unoccupied vehicle from driving away is provided. In one example implementation, the vehicle system includes a shifter configured to move the vehicle between Park, Reverse, Neutral, and Drive (PRND) positions, a brake system controller configured to selectively engage and disengage a parking brake and/or a park pawl, an occupant restraint controller configured to determine a buckled or unbuckled status of a driver seat belt, a body computer configured to determine if a driver door is ajar, a camera-based monitoring system configured to determine a driver presence within the vehicle. A controller, having one or more processors, is in signal communication with the shifter, the brake system controller, the occupant restraint controller, the body computer, and the camera-based monitoring system.

The controller is programmed to determine if a first set of conditions is satisfied to initiate a normal operation of the automatic vehicle securement feature, initiate the automatic vehicle securement feature, if the first set of conditions is satisfied, and engage the parking brake and/or parking pawl to thereby prevent the vehicle from driving away, determine if there is a fault of the first set of conditions, if the first set of conditions is not satisfied, determine, by the camera-based monitoring system, if a driver is present within the vehicle, if there is a fault of the first set of conditions, initiate the automatic vehicle securement feature, if the driver is determined not present within the vehicle, even though the first set of conditions is not satisfied.

In addition to the foregoing, the described vehicle system may include one or more of the following features: wherein the first set of conditions includes the occupant restraint system indicates the driver seat belt is unbuckled, the body computer indicates the driver door is ajar, a brake pedal is not pressed, and the vehicle is not in Park; wherein the fault comprises at least one of: a driver presence seat sensor input from the occupant restraint sensor is faulted, and a driver door ajar status from the body computer is faulted; and wherein the fault includes all of a brake pedal input is faulted, a PRND state/gear state input is faulted, a seat belt status input is faulted, a driver door ajar status input is faulted, and a driver presence seat sensor status input is faulted.

In addition to the foregoing, the described vehicle system may include one or more of the following features: wherein the fault includes a driver presence seat sensor status input is faulted, or at least one of a driver door ajar status input is faulted and a driver seat belt status input is faulted; wherein the fault includes a driver presence seat sensor status input is faulted, or a driver door ajar status input is faulted; and wherein the fault includes a driver presence seat sensor status input is faulted, or a driver door ajar status input is faulted and a driver seat belt status input is faulted.

In addition to the foregoing, the described vehicle system may include one or more of the following features: wherein if a driver presence input of the camera-based monitoring system if faulted, the controller is programmed to disable the automatic vehicle securement feature; and wherein the controller is programmed to initiate the automatic vehicle securement feature if the first set of conditions is not satisfied, but the fault comprises a seat belt status input is faulted, at least one of a driver door ajar status is not faulted or a driver presence seat sensor status input is not faulted, and the vehicle is not in Park, and at least one of (i) the driver door is ajar and (ii) the driver is not detected through a driver presence seat sensor status input.

In accordance with another example aspect of the invention, a computer-implemented method for operating a vehicle system having an automatic vehicle securement feature to prevent an unoccupied vehicle from driving away is provided. In one example implementation, the vehicle includes a shifter configured to move the vehicle between Park, Reverse, Neutral, and Drive (PRND) positions, a brake system controller configured to selectively engage and disengage a parking brake and/or park pawl, an occupant restraint controller configured to determine a buckled or unbuckled status of a driver seat belt, a body computer configured to determine if a driver door is ajar, a camera-based monitoring system configured to determine a driver presence within the vehicle, and a controller having one or more processors and a non-transitory computer-readable storage medium.

In one example implementation, the method includes determining, by the controller, if a first set of conditions is satisfied to initiate a normal operation of the automatic vehicle securement feature; initiating, by the controller, the automatic vehicle securement feature, if the first set of conditions is satisfied, and engaging the parking brake and/or parking pawl to thereby prevent the vehicle from driving away; determining, by the controller, if there is a fault of the first set of conditions, if the first set of conditions is not satisfied; determining, by the camera-based monitoring system, if a driver is present within the vehicle, if there is a fault of the first set of conditions; and initiating, by the controller, the automatic vehicle securement feature, if the driver is determined not present within the vehicle, even though the first set of conditions is not satisfied.

In addition to the foregoing, the described method may include one or more of the following features: wherein the first set of conditions includes the occupant restraint system indicates the driver seat belt is unbuckled, the body computer indicates the driver door is ajar, a brake pedal is not pressed, and the vehicle is not in Park; wherein the fault comprises at least one of a driver presence seat sensor input from the occupant restraint sensor is faulted, and a driver door ajar status from the body computer is faulted; and wherein the fault comprises all of a brake pedal input is faulted, a PRND state/gear state input is faulted, a seat belt status input is faulted, a driver door ajar status input is faulted, and a driver presence seat sensor status input is faulted.

In addition to the foregoing, the described method may include one or more of the following features: wherein the fault includes a driver presence seat sensor status input is faulted, or at least one of a driver door ajar status input is faulted and a driver seat belt status input is faulted; and wherein the fault includes a driver presence seat sensor status input is faulted, or a driver door ajar status input is faulted; and wherein the fault includes a driver presence seat sensor status input is faulted, or a driver door ajar status input is faulted and a driver seat belt status input is faulted.

In addition to the foregoing, the described method may include one or more of the following features: disabling, by the controller, the automatic vehicle securement feature if a driver presence input of the camera-based monitoring system if faulted; and initiating, by the controller, the automatic vehicle securement feature if the first set of conditions is not satisfied, but (i) the fault comprises a seat belt status input is faulted, (ii) at least one of a driver door ajar status is not faulted or a driver presence seat sensor status input is not faulted, and (iii) the vehicle is not in Park, and at least one of (a) the driver door is ajar and (b) the driver is not detected through a driver presence seat sensor status input.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a chart of example scenarios for enabling a vehicle securement feature with faulted sensors according to the principles of the present disclosure.

DETAILED DESCRIPTION

As previously discussed, some vehicles are equipped with a drive away inhibition (DAI), or vehicle securement feature configured to prevent a vehicle from unintentionally driving away. If proper enabling conditions are detected, the vehicle will activate the DAI strategy to secure the vehicle, for example, by automatically engaging a vehicle park pawl or electronic park brake (ePB). However, in some scenarios, faults may cause the enabling conditions to go undetected, thereby disabling the DAI function. Example faults include loss of communication between a DAI supervisory controller and various vehicle components that provide enabling condition statuses. Accordingly, described herein are systems and methods for enhanced vehicle securement strategies to prevent DAI disablement due to loss of communication or other faults.

In general, the systems and methods described herein provide an enhanced DAI or vehicle securement feature to enable proper implementation of the vehicle securement even when some activation conditions are faulted. In particular, the vehicle system utilizes a driver seat belt status, a driver door ajar status, a driver presence (seat sensor) status, and a driver presence (camera) status to determine if the vehicle securement feature should be enabled. The system allows for one or more of the described status signals to be faulted (or not received) and still provide the capability to enable the DAI feature based on the remaining working (not faulted) statuses. In one example, a vehicle interior camera provides the driver presence (camera) status and is utilized as a last resort to initiate the vehicle securement if one or more of the remaining statuses are faulted or unavailable.

In one example, a driver detection presence signal communication from an autonomous or assisted driving system is redundant due to the existing network communication design on dual CAN buses with a supervisory controller. This system can cover for all faulted scenarios including critical bus off. Utilizing a 'driver present' signal from a vehicle interior camera system still allows DAI enablement even when all other inputs such as door open, driver presence (seat) sensor, and seat belt unbuckled statuses are either faulted or not received. Accordingly, by determining driver present status through interior camera systems, it is possible to prevent hazardous situations even with extremely critical failures on the vehicle.

Figure 1:
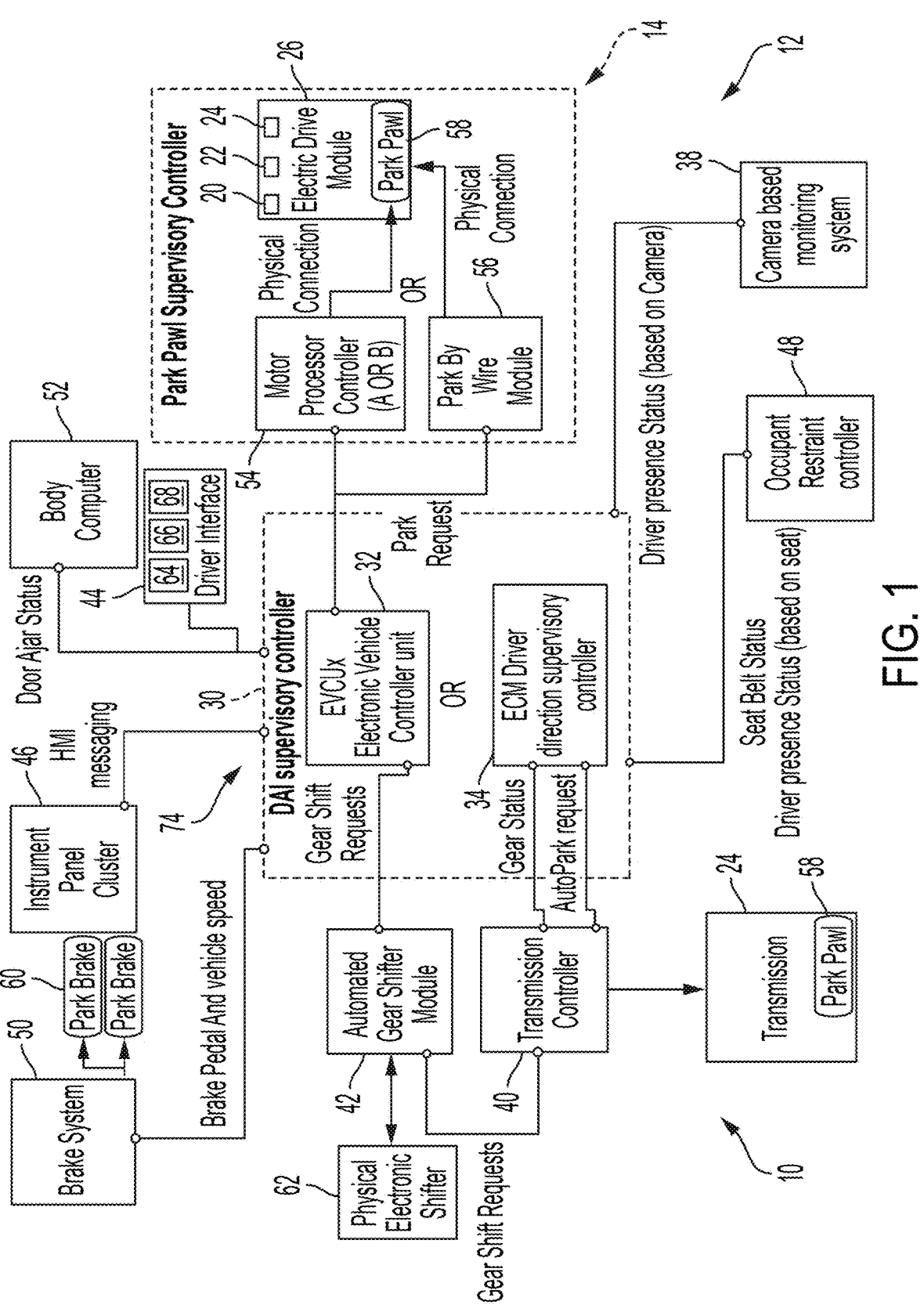
FIG. 1 is a schematic block diagram of an exemplary vehicle system according to the principles of the present disclosure.

Referring now to FIG. 1, a schematic diagram of a vehicle system 10 for a vehicle 12 according to example implementations of the disclosure is illustrated. In accordance with various aspects of the present disclosure, interactive techniques for vehicle drive away securement of the vehicle 12 are implemented utilizing the vehicle system 10. The vehicle 12 may have various configurations, propulsion systems, and controllers therefor. For example, the vehicle 12 may be an electrified vehicle, an internal combustion engine vehicle, or a combination thereof (e.g., hybrid-electric vehicle).

With continuing reference to FIG. 1, the exemplary vehicle system 10 of the exemplary electrified vehicle 12 includes an electrified powertrain or propulsion system 14 configured to transfer drive torque to a driveline (not shown) of the vehicle 12 for propulsion. The electrified powertrain 14 generally comprises a high voltage battery system (not shown), and one or more electric motors 20 with an associated inverter 22, and a gearbox or transmission 24. The one or more electric motors 20, the inverter 22, and the transmission 24 can be collectively referred to herein as an electric drive module 26. While the exemplary implementation includes a transmission 24, in some examples the electrified powertrain 14 does not include a transmission.

The vehicle system 10 further includes a supervisory controller 30, which may include an electronic vehicle controller unit (EVCU) 32 and/or an engine control module (ECM) 34. The supervisory controller 30 is in signal communication with a camera-based monitoring system 38, a transmission control module (TCM) 40, an automated gear shifter management (AGSM) system 42, a driver interface 44, an instrument panel cluster 46, an occupant restraint controller 48, a brake system controller 50, and a body computer 52.

The supervisory controller 30 includes one or more controllers (e.g., ECU, EVCU) configured to control operations of the vehicle 12. For example, controller 30 is configured to arbitrate park, reverse, neutral, and drive (PRND) after the driver selects a position through shifter inputs. In some cases, the controller 30 controls the park pawl system directly. In EVs or range extended electric vehicles (REEVs), the park pawl can be managed directly by a motor processor controller 54.

The supervisory controller 30 is also in signal communication with the motor processor controller 54 for controlling the motor 20, as well as a park by wire module 56 configured to engage/disengage a park pawl 58. In the example implementation, the motor processor controller 54, the park by wire module 56, and the EDM 26 may be collectively referred to as a park pawl supervisory controller.

In the example embodiment, the camera-based monitoring system 38 is part of an advanced driver assist system (ADAS) and/or autonomous driving system (not shown) and includes an interior camera configured to provide one or more input signals indicative of whether or not the driver is physically present in the vehicle. The TCM 40 is a controller for controlling the transmission 24, including engaging and disengaging the park pawl 58. The AGSM system 42 is in signal communication with a transmission shift request device, such as an electronic shifter 62, for the driver to request a desired gear of the transmission 24. The shifter 62 can provide conventional transmission options including park, reverse, neutral, drive and low (PRNDL).

The driver interface 44 includes a steering wheel 64, a brake pedal 66, and a driver input device (e.g., an accelerator pedal 68) for providing a driver input (e.g., a torque request) to the motor 20. The driver interface 44 also includes a transmission shift request device, such as the shifter 62, for the driver to request a desired gear (PRND) of the transmission 24.

The instrument panel cluster 46 includes any human machine interface (HMI), such as a driver information center and/or vehicle infotainment system (e.g., touchscreen display) capable of receiving input from a driver. The instrument panel cluster 46, also referred to as HMI 46, is configured to provide various notifications to the user during the override process, as described herein. The occupant restraint controller 48 is configured to determine a seat belt status (e.g., buckled, unbuckled) and/or a driver presence status (e.g., based on a seat sensor). The body computer 52 is configured to detect a status of the driver door (e.g., open/closed).

The brake system controller 50 is configured to control one or more vehicle brakes, including one or more electronic parking brakes (ePB) 60 when present. The transmission 24 and brake system controller 50 are coupled or selectively coupled, directly or indirectly, to one or more wheels (not shown) of vehicle 12, as is known in the art. In the exemplary vehicle system, all of the wheels are drive wheels that receive torque input. While the motor 20 is described herein as an electric traction motor, in other examples, the vehicle system 10 can be configured with a conventional internal combustion engine (ICE), or as a hybrid electric vehicle.

One or more controllers are utilized to control the various vehicle components or system discussed above. In one exemplary implementation, various individual controllers are utilized to control the various components/systems discussed herein and are in communication with each other and/or the various components/systems via a local interface 74. In this exemplary implementation, the local interface 74 is one or more buses or other wired or wireless connections, as is known in the art. In the example illustrated in FIG. 1, the local interface 74 is a controller area network (CAN).

The CAN 74 may include additional elements or features, which have been omitted for simplicity, such as controllers, buffers (cache) drivers, repeaters and receivers, among many others, to enable communications. Further, the CAN 74 may include address, control and/or data connections to enable appropriate communications among the components/systems described herein.

It will be appreciated that while individual control units are discussed herein and shown in various Figures, the individual control units may also be optionally implemented in the form of one control unit, such as a powertrain or vehicle control unit. Thus, it will be appreciated that while the discussion will continue with reference to the individual controllers discussed above, the discussion is equally applicable to the components of vehicle system 10 being controlled by one controller.

As previously described, the vehicle system 10 is configured to provide a DAI function, or automatic vehicle securement function, to prevent a vehicle from unintentionally driving away when the vehicle is not in Park and the driver has exited the vehicle. To prevent disablement of the vehicle securement function due to loss of communication with sensors or other sensor faults, the vehicle securement function includes multiple levels of redundancy to the enable conditions that must be satisfied in order to initiate the vehicle securement function.

FIG. 2 illustrates an example chart 100 illustrating various scenarios where the DAI/vehicle securement feature remains enabled even when sensor systems have faulted. In one example, the order of operations for the "enable conditions" for the DAI feature are shown from top to bottom with Scenario 1 being utilized first, and Scenario 4 being utilized last when enabling the DAI feature.

Figure 3A:
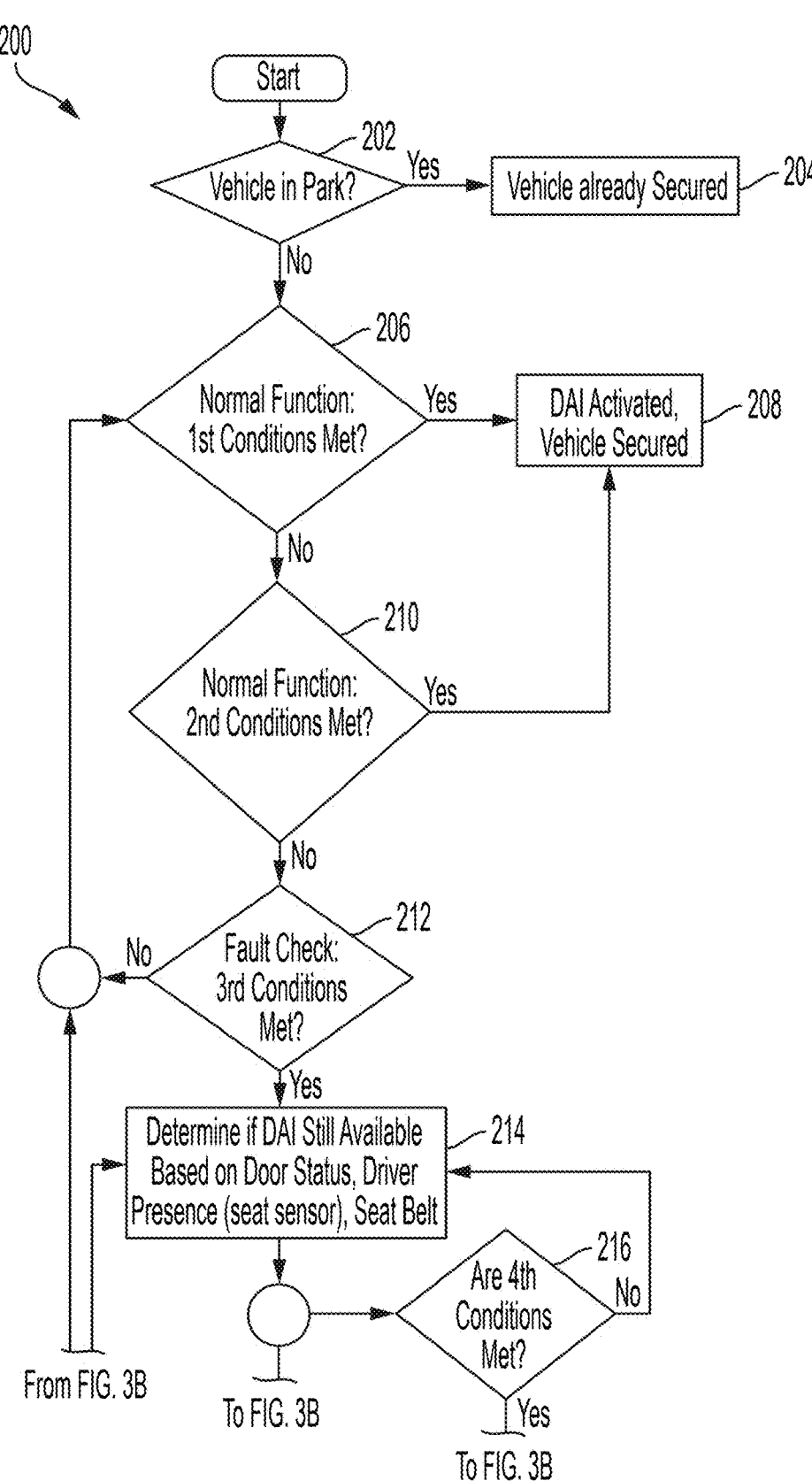
FIGS. 3A-3C illustrate an example flow diagram of operating the vehicle system of FIG. 1 according to the principles of the present disclosure.
Figure 3B:
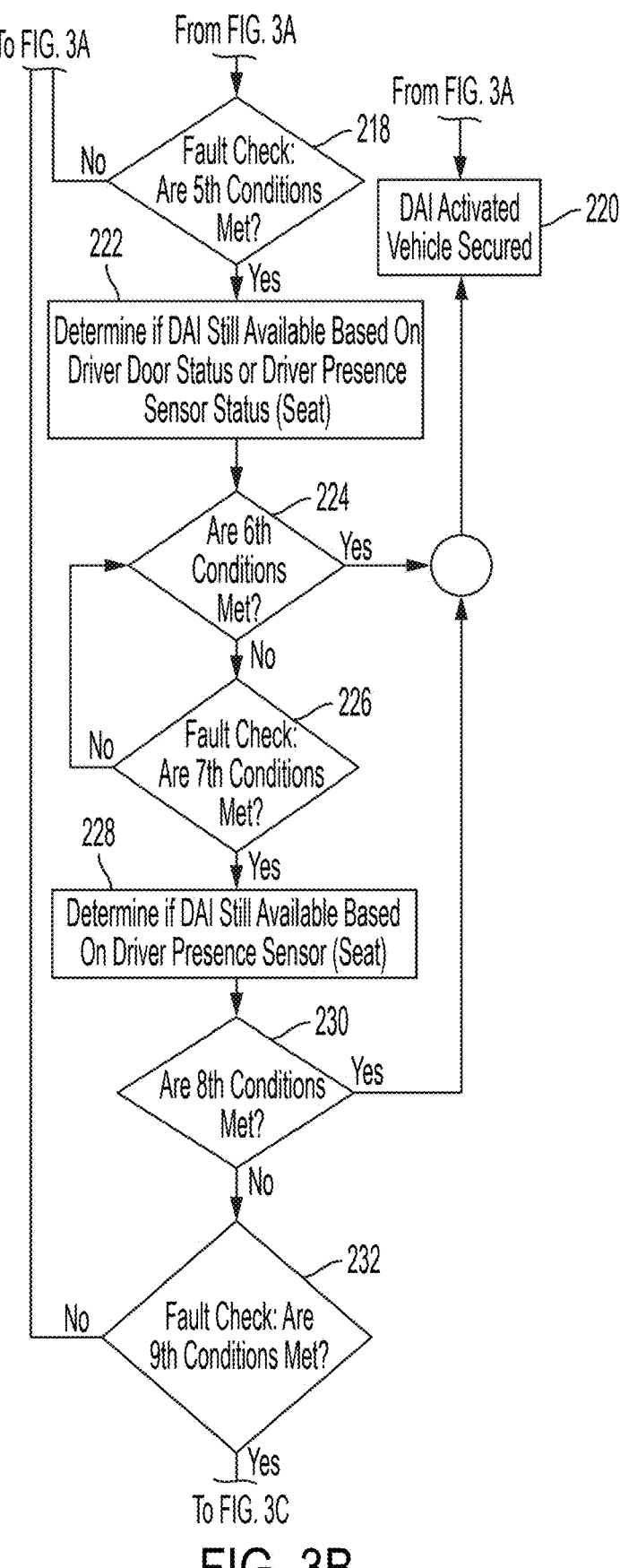
Figure 3C:
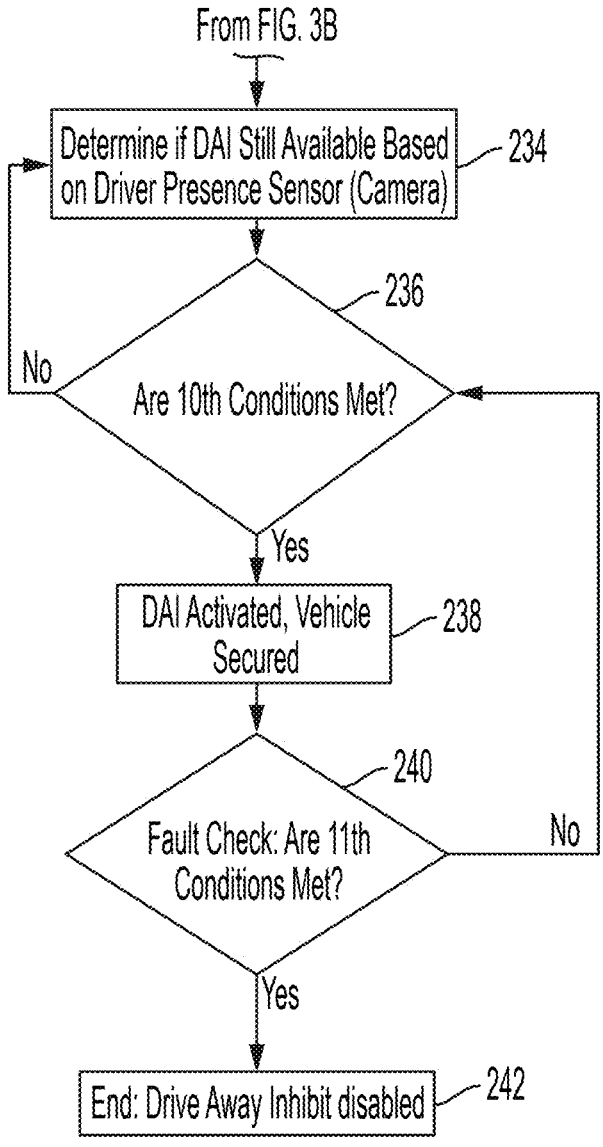

With reference now to FIGS. 3A-3C, an example method 200 for performing a Vehicle Securement with the vehicle system 10 is illustrated. While the vehicle system 10 and its components are specifically discussed for descriptive/illustrative purposes, it will be appreciated that the method 100 could be applicable to any suitable vehicle. In general, the method 200 checks if various conditions are satisfied to initiate the vehicle securement feature (DAI). If one or more of the conditions are not satisfied, the method checks if any sensor faults are detected that result in the condition(s) not being satisfied. The method escalates the condition checks with various sensors to determine if the vehicle securement feature is still active/available (i.e., not disabled). Finally, the method utilizes the camera-based monitoring system 38 as a means to activate the vehicle securement feature if the other checks fail.

The method 200 begins at step 202 and the supervisory controller 30 ("control") determines if the vehicle 12 is in Park. If yes, at 204, control determines the vehicle is already secure and the method ends or returns to 202. If no, at 206, control determines if a first set of conditions is satisfied for normal function of the automatic vehicle securement feature. In one example, the first set of conditions includes: (i) is the brake pedal 66 not pressed?; (ii) is the vehicle speed less than a predetermined park engagement speed (e.g., 2 mph)?; (iii) is the vehicle not in Park?; (iv) is the driver door ajar?; and (v) is the driver seat belt unbuckled? If all first conditions are TRUE, control proceeds to step 208 and activates the vehicle securement feature (DAI) to secure the vehicle 12 by engaging the park pawl 58 and/or the ePB 60. If at least one of the first conditions is FALSE, control proceeds to step 210.

At step 210, control determines if a second set of conditions is satisfied for normal function of the automatic vehicle securement feature. In one example, the second set of conditions includes: (i) is the brake pedal 66 not pressed?; (ii) is the vehicle speed less than a predetermined park engagement speed (e.g., 2 mph)?; (iii) is the vehicle not in Park?; (iv) is the 'driver presence' not detected by the seat sensor of occupant restraint controller 48, when the driver door is not present (e.g., removed); and (v) is the driver seat belt unbuckled? If all second conditions are TRUE, control proceeds to step 208 and secures the vehicle. If at least one of the second conditions is FALSE, control proceeds to step 212.

At step 212, control determines if a third set of conditions is satisfied. In one example, the third set of conditions includes: (i) is a brake input from brake pedal 66 faulted?; (ii) is a vehicle speed input (e.g., from wheel speed sensors, not shown) faulted?; and (iii) is a PRND state/Gear state input (e.g., from TCM 40, AGSM 42, etc.) faulted? If all third conditions are FALSE, control returns to step 206. If at least one of the third conditions are TRUE, control proceeds to step 214.

At step 214, control proceeds to determine if the vehicle securement feature is still active/available (i.e., not disabled) based on the driver door status (e.g., from body computer 52), driver presence sensor status (seat), and seat belt status (e.g., from occupant restraint controller 48). Control then proceeds to steps 216 and/or 218, which may be performed simultaneously.

At step 216, control determines if a fourth set of conditions is satisfied. In one example, the fourth set of conditions includes: (i) is the vehicle not in Park? AND (ii) is the seat belt unbuckled and the driver door ajar? OR (iii) is the driver not detected through the seat sensor? If (i) and at least one of (ii) and (iii) are TRUE, control proceeds to step 220 and activates the vehicle securement feature (DAI) to secure the vehicle 12 by engaging the park pawl 58 and/or the ePB 60. If (i) or at least one of (ii) and (iii) are FALSE, control returns to step 214.

At step 218, control determines if a fifth set of conditions is satisfied. In one example, the fifth set of conditions includes: (i) is a seat belt status input signal (e.g., from occupant restraint controller 48) faulted? AND (ii) is the driver door ajar status input signal (e.g., from body computer 52) not faulted? OR (iii) is the driver presence seat sensor status input signal not faulted? If FALSE, control returns to step 214. If TRUE, control proceeds to step 222 and determines if the vehicle securement feature is still active/available based on the driver door status (e.g., from body computer 52) or the driver presence sensor status (seat) (e.g., from occupant restraint controller 48).

At step 224, control determines if a sixth set of conditions is satisfied. In one example, the sixth set of conditions includes: (i) is the vehicle not in Park? AND (ii) is the driver door ajar? OR (iii) is the driver not detected through the driver presence sensor status input (seat)? If TRUE, control proceeds to step 220 and secures the vehicle 12. If FALSE, control proceeds to step 226.

At 226, control determines if a seventh set of conditions is satisfied. In one example, the seventh set of conditions includes: (i) is the driver door ajar status input faulted? AND (ii) is the driver presence (seat) sensor status input not faulted? If FALSE, control returns to step 224. If TRUE, control proceeds to step 228 and determines if the vehicle securement feature is still active based on the driver presence sensor status (seat).

At 230, control determines if an eighth set of conditions is satisfied. In one example, the eighth set of conditions includes: (i) is the vehicle not in Park? AND (ii) is the driver not detected through the driver presence (seat) sensor status input? If TRUE, control proceeds to step 220 and activates the vehicle securement feature. If FALSE, control proceeds to step 232.

At 232, control determines if a ninth set of conditions is satisfied. In one example, the ninth set of conditions includes: (i) is the brake pedal input faulted?; (ii) is the vehicle speed input faulted?; (iii) is the PRND state/Fear state input faulted?; (iv) is the seat belt status input faulted?; (v) is the driver door ajar status input faulted?; and (vi) and is the driver presence (seat) sensor status input faulted? If FALSE, control returns to step 206. If TRUE, control proceeds to step 234 and determines if the vehicle securement feature is still active based on the driver presence sensor (camera) input from camera-based monitoring system 38.

At step 236, control determines if a tenth set of conditions is satisfied. In one example, the tenth set of conditions includes: (i) is the vehicle not in Park? AND (ii) is the driver not detected through the driver presence sensor status (camera)? If FALSE, control returns to step 234. If TRUE, control proceeds to step 238 and activates the vehicle securement feature (DAI) to secure the vehicle 12 by engaging the park pawl 58 and/or the ePB 60.

At step 240, control determines if an eleventh set of conditions is satisfied. In one example, the eleventh set of conditions includes: (i) is the brake pedal input faulted?; (ii) is the vehicle speed input faulted?; (iii) is the PRND state/Gear state input faulted?; (iv) is the seat belt status input faulted?; (v) is the driver door ajar status input faulted?; (vi) is the driver presence (seat) sensor status input faulted?; and (vii) is the driver presence (camera) sensor status input faulted? If FALSE, control returns to step 236. If all TRUE, control proceeds to step 242 and disabled the vehicle securement feature. Control then ends or returns to step 202 for one or more cycles.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle system having an automatic vehicle securement feature to prevent an unoccupied vehicle from driving away, the vehicle system comprising:

a shifter configured to move the vehicle between Park, Reverse, Neutral, and Drive (PRND) positions;

a brake system controller configured to selectively engage and disengage a parking brake and/or a park pawl;

an occupant restraint controller configured to determine a buckled or unbuckled status of a driver seat belt;

a body computer configured to determine if a driver door is ajar;

a camera-based monitoring system configured to determine a driver presence within the vehicle; and a controller, having one or more processors, in signal communication with the shifter, the brake system controller, the occupant restraint controller, the body computer, and the camera-based monitoring system, the controller programmed to:

determine if a first set of conditions is satisfied to initiate a normal operation of the automatic vehicle securement feature;

initiate the automatic vehicle securement feature, if the first set of conditions is satisfied, and engage the parking brake and/or parking pawl to thereby prevent the vehicle from driving away;

determine if there is a fault of the first set of conditions, if the first set of conditions is not satisfied;

determine, by the camera-based monitoring system, if a driver is present within the vehicle, if there is a fault of the first set of conditions; and initiate the automatic vehicle securement feature, if the driver is determined not present within the vehicle, even though the first set of conditions is not satisfied.

2. The vehicle system of claim 1, wherein the first set of conditions comprises:

the occupant restraint system indicates the driver seat belt is unbuckled;

the body computer indicates the driver door is ajar;

a brake pedal is not pressed; and the vehicle is not in Park.

3. The vehicle system of claim 2, wherein the fault comprises at least one of:

a driver presence seat sensor input from the occupant restraint sensor is faulted; and a driver door ajar status from the body computer is faulted.

4. The vehicle system of claim 2, wherein the fault comprises all of:

a brake pedal input is faulted;

a PRND state/gear state input is faulted;

a seat belt status input is faulted;

a driver door ajar status input is faulted; and a driver presence seat sensor status input is faulted.

5. The vehicle system of claim 2, wherein the fault comprises:

a driver presence seat sensor status input is faulted; or at least one of a driver door ajar status input is faulted and a driver seat belt status input is faulted.

6. The vehicle system of claim 2, wherein the fault comprises:

a driver presence seat sensor status input is faulted; or a driver door ajar status input is faulted.

7. The vehicle system of claim 2, wherein the fault comprises:

a driver presence seat sensor status input is faulted; or a driver door ajar status input is faulted and a driver seat belt status input is faulted.

8. The vehicle system of claim 1, wherein if a driver presence input of the camera-based monitoring system if faulted, the controller is programmed to disable the automatic vehicle securement feature.

9. The vehicle system of claim 1, wherein the controller is programmed to initiate the automatic vehicle securement feature if the first set of conditions is not satisfied, but:

the fault comprises a seat belt status input is faulted;

at least one of a driver door ajar status is not faulted or a driver presence seat sensor status input is not faulted; and the vehicle is not in Park, and at least one of (i) the driver door is ajar and (ii) the driver is not detected through a driver presence seat sensor status input.

10. A computer-implemented method for operating a vehicle system having an automatic vehicle securement feature to prevent an unoccupied vehicle from driving away, the vehicle including a shifter configured to move the vehicle between Park, Reverse, Neutral, and Drive (PRND) positions, a brake system controller configured to selectively engage and disengage a parking brake and/or park pawl, an occupant restraint controller configured to determine a buckled or unbuckled status of a driver seat belt, a body computer configured to determine if a driver door is ajar, a camera-based monitoring system configured to determine a driver presence within the vehicle, and a controller having one or more processors and a non-transitory computer-readable storage medium, the method comprising:

determining, by the controller, if a first set of conditions is satisfied to initiate a normal operation of the automatic vehicle securement feature;

initiating, by the controller, the automatic vehicle securement feature, if the first set of conditions is satisfied, and engaging the parking brake and/or parking pawl to thereby prevent the vehicle from driving away;

determining, by the controller, if there is a fault of the first set of conditions, if the first set of conditions is not satisfied;

determining, by the camera-based monitoring system, if a driver is present within the vehicle, if there is a fault of the first set of conditions; and initiating, by the controller, the automatic vehicle securement feature, if the driver is determined not present within the vehicle, even though the first set of conditions is not satisfied.

11. The method of claim 10, wherein the first set of conditions comprises:

the occupant restraint system indicates the driver seat belt is unbuckled;

the body computer indicates the driver door is ajar;

a brake pedal is not pressed; and the vehicle is not in Park.

12. The method of claim 11, wherein the fault comprises at least one of:

a driver presence seat sensor input from the occupant restraint sensor is faulted; and a driver door ajar status from the body computer is faulted.

13. The method of claim 11, wherein the fault comprises all of:

a brake pedal input is faulted;

a PRND state/gear state input is faulted;

a seat belt status input is faulted;

a driver door ajar status input is faulted; and a driver presence seat sensor status input is faulted.

14. The method of claim 11, wherein the fault comprises:

a driver presence seat sensor status input is faulted; or at least one of a driver door ajar status input is faulted and a driver seat belt status input is faulted.

15. The method of claim 11, wherein the fault comprises:

a driver presence seat sensor status input is faulted; or a driver door ajar status input is faulted.

16. The method of claim 11, wherein the fault comprises:

a driver presence seat sensor status input is faulted; or a driver door ajar status input is faulted and a driver seat belt status input is faulted.

17. The method of claim 10, further comprising:

disabling, by the controller, the automatic vehicle securement feature if a driver presence input of the camera-based monitoring system if faulted.

18. The method of claim 10, further comprising initiating, by the controller, the automatic vehicle securement feature if the first set of conditions is not satisfied, but:

the fault comprises a seat belt status input is faulted;

at least one of a driver door ajar status is not faulted or a driver presence seat sensor status input is not faulted; and the vehicle is not in Park, and at least one of (i) the driver door is ajar and (ii) the driver is not detected through a driver presence seat sensor status input.

* * * * *